United States Patent
Morford

(10) Patent No.: US 6,584,719 B1
(45) Date of Patent: Jul. 1, 2003

(54) FIREARM LOCK INSERTS

(75) Inventor: Ted Morford, Bozeman, MT (US)

(73) Assignee: Big Sky Racks, Inc., Bozeman, MT (US)

( * ) Notice: Subject to any disclaimer, the term of this patent is extended or adjusted under 35 U.S.C. 154(b) by 0 days.

(21) Appl. No.: 09/670,629

(22) Filed: Sep. 27, 2000

(51) Int. Cl.[7] .............................................. F41A 29/00
(52) U.S. Cl. ........................... 42/94; 42/70.11; 224/551
(58) Field of Search .................................. 42/94, 70.11

(56) References Cited

U.S. PATENT DOCUMENTS

| | | | | | |
|---|---|---|---|---|---|
| 3,802,612 A | * | 4/1974 | Smith | .......................... | 224/1 R |
| 5,375,337 A | * | 12/1994 | Butler | .......................... | 33/506 |
| 5,683,021 A | * | 11/1997 | Setina | .......................... | 224/311 |
| 5,768,819 A | * | 6/1998 | Neal | .............................. | 42/96 |
| 5,779,120 A | * | 7/1998 | Morford | ...................... | 224/571 |
| 5,810,221 A | * | 9/1998 | Beletsky et al. | ............. | 224/244 |
| 5,860,573 A | * | 1/1999 | Hossack et al. | ............ | 224/483 |
| 5,979,846 A | * | 11/1999 | Fluhr | ......................... | 248/200 |
| 6,047,870 A | * | 4/2000 | Morford | ...................... | 224/551 |
| 6,272,785 B1 | * | 8/2001 | Mika et al. | ..................... | 42/94 |
| 6,360,931 B1 | * | 3/2002 | Morford | ...................... | 224/551 |
| 6,397,507 B1 | * | 6/2002 | Marshall et al. | ............... | 42/72 |
| 6,438,885 B1 | * | 8/2002 | Murray et al. | ............. | 42/70.07 |

FOREIGN PATENT DOCUMENTS

EP          0813038 A2 * 12/1997        ............ F41A/23/18

* cited by examiner

Primary Examiner—Michael J. Carone
Assistant Examiner—M. Thomson
(74) Attorney, Agent, or Firm—DL Tschida

(57) ABSTRACT

A firearm support cushion or insert for a lock assembly. The inserts are formed to accept and restrain the fore-stock and/or receiver of a variety of specific firearms, for example, pump and auto-loading shotguns and rifles. The inserts include surfaces and/or recesses that conform to the contours of predetermined portions of a firearm. Fastener mechanisms facilitate a detachable mounting of the inserts to the lock assembly and whereby a user can periodically adapt the lock to accept different types of firearms.

9 Claims, 7 Drawing Sheets

FIREARM LOCK INSERTS

BACKGROUND OF THE INVENTION

The present invention relates to firearm support assemblies and, in particular, to an improved clamping lock assembly that is adapted to support a number of conformal inserts or support cushions specifically molded for individual firearms that can be mounted in the lock.

A variety of firearm supports have been developed over the years to retain firearms within automobiles and trucks. The assemblies support the firearms in horizontal and upright postures to available vehicle structures to provide ready access for the driver. Locking assemblies are frequently included to prevent theft or unauthorized access.

Locked support assemblies are especially important to the law enforcement community. A number of support assemblies sold by Big Sky Racks, Inc., Bozeman, Mont. and others use a keyed lock of a type shown in U.S. Pat. No. 4,747,280. The lock is adaptable to be electrically activated. The lock provides a clamp arm that is hinged to a cast body having a U-shaped space that accepts a portion of a firearm. A felt liner is typically provided in the clamp space and to the clamp arm to prevent marring the firearm when the clamp arm is latched to the body.

Although such locks have proven especially durable, the oversized construction of the clamp space can permit a substantial amount of firearm movement with movement of the supporting vehicle. The movement can be distracting. Over time, the movement can also mar and scratch the firearm and/or remove the bluing.

The present invention was developed to provide an improved lock assembly and a variety of conformal and specially formed inserts that mount in the clamp space of the firearm lock to closely contain a portion of a firearm secured thereto. The inserts are formed to contain specific portions of a variety of different types and models of firearms. The inserts are particularly adapted to support a variety of pump-action and auto-loading shotguns, rifles and machine guns. The inserts are restrained to the lock assembly to permit an inverted mounting, yet are detachable to accommodate supporting any of the preferred firearms to the lock assembly.

SUMMARY OF THE INVENTION

It is accordingly a primary object of the invention to provide a detachable, non-marring insert or support cushion for a firearm that can be mounted to a lock assembly.

It is a further object of the invention to provide a firearm arm lock insert that conforms to a portion of a particular firearm fitted thereto.

It is a further object of the invention to provide an insert that is substantially preshaped to support and shield a selected portion of a predetermined firearm.

It is a further object of the invention to provide detachable fasteners to interlock the insert to the lock assembly.

It is a further object of the invention to provide inserts with a multi-walled shell having fasteners that mate with the lock assembly and a number of shaped, displaced parallel webs that project from the shell walls and include contoured recesses that mate with complementary surfaces of a predetermined firearm.

The foregoing objects, advantages and distinctions of the invention, among others, are obtained in a presently preferred lock assembly that accommodates a number of molded inserts. The inserts are formed to accept and restrain the fore-stock and/or receiver of a variety of specific firearms, for example, pump and auto-loading shotguns and rifles.

When the lock is latched, the inserts include a surface that conforms to the contours of the firearm to protect the firearm from marring and scratching, restrict firearm movement and prevent unauthorized access. The inserts include fastener mechanisms that facilitate a detachable mounting of the inserts to the lock. A user can thereby periodically adapt the lock by changing the insert to accept different types of firearms.

Still other objects, advantages, distinctions and constructions of the invention will become more apparent from the following description with respect to the appended drawings. Similar components and assemblies are referred to in the various drawings with similar alphanumeric reference characters. Various features of the invention may also be configured with other features in different combinations. The description should therefore not be literally construed in limitation of the invention. Rather, the invention should be interpreted within the broad scope of the further appended claims.

DESCRIPTION OF THE PREFERRED EMBODIMENTS

Figure 1:
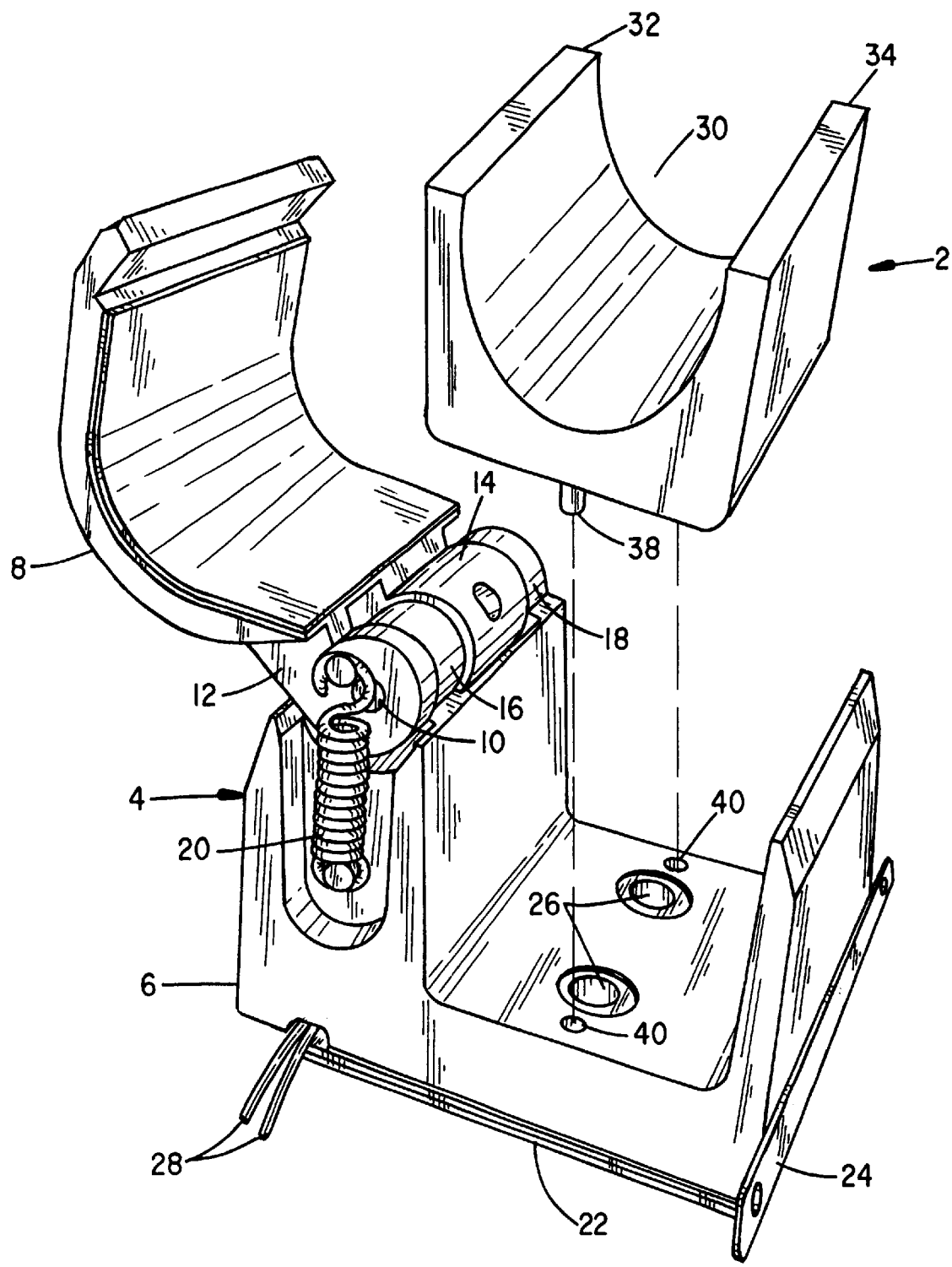
FIG. 1 is a perspective drawing to a solid, molded insert shown in exploded assembly that is used to cradle and restrain a long-gun to the manual and/or electronically keyed lock assembly.

Referring to FIG. 1 a perspective drawing is shown to a conformal insert 2 that can be constructed to a variety of shapes and that can be secured to a firearm lock assembly 4. The insert 2 is particularly adapted to securely restrain a firearm to the lock assembly 4 at a vehicle mounted firearm support. The firearm support can be secured to the vehicle ceiling, a divider cage/window, a roll bar. The lock assembly 4 and one or more cradles contain the firearm to the support.

The construction and shape of the insert 2 can be adapted to a variety of firearms and prevent marring the firearm. A variety of support cushions or elastomer inserts 2 of tailored shapes that are compatible with the surface contours of a number of firearms used by the law enforcement community are described below.

The lock assembly 4 includes a cast base or body 6 and a clamp or latch arm 8. The clamp arm 8 is secured to pivot relative to the body 6 at a hinge pin 10 that mounts in aligned piano hinge pieces 12 and 14 that extend from the arm 8 and hinge pieces 16 and 18 that extend from the body 6. A spring 20 biases the latch arm 8 to a locked position. A mounting plate 22 and rail 24 can be secured to the lock 4 with a variety of fasteners (not shown) at through holes 26. The plate 22 and rail 24, in turn, can be secured to the support framework of a firearm support and/or directly to the vehicle.

A keyed tumbler is included with the lock assembly 4 that cooperates with the hinge pin 10 to secure the arm 8 in its latched condition when rotated into contact with the body 6. A remote switch (not shown) is also coupled to the lock 4 via conductors 28 to operate the latch arm 8.

The insert 2 is constructed of a molded elastomer that defines a recess 30 between a pair of vertical arms 32 and 34 and a base 36. The insert 2 can be molded from a variety of materials, including foams, polymers, rubber and materials containing fillers, and composites to any desired durometer. The insert 2 can also be molded with regions of differing durometer, for example, the arms 32 and 34 can be softer than the base 36. The surface contour of the recess 30 can be formed to provide any desired support characteristic.

Figure 2:
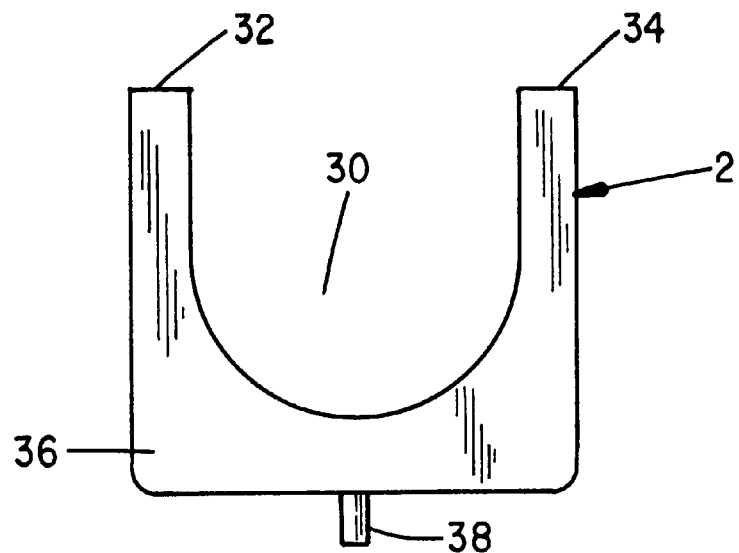
FIG. 2 is a side view of the insert of FIG. 1.
Figure 3:
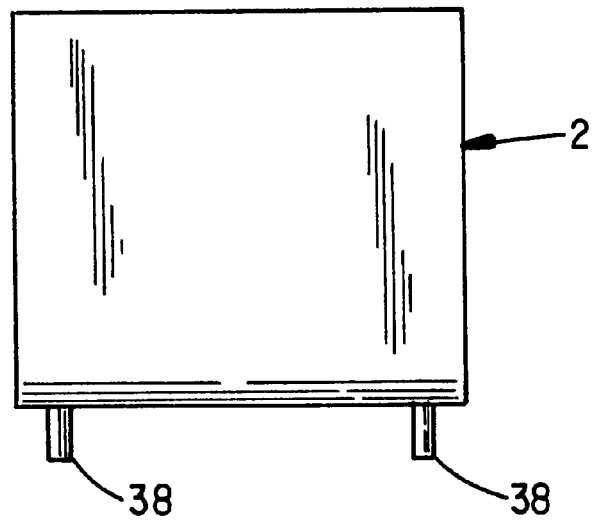
FIG. 3 is a front view of the insert of FIG. 1.
Figure 4:
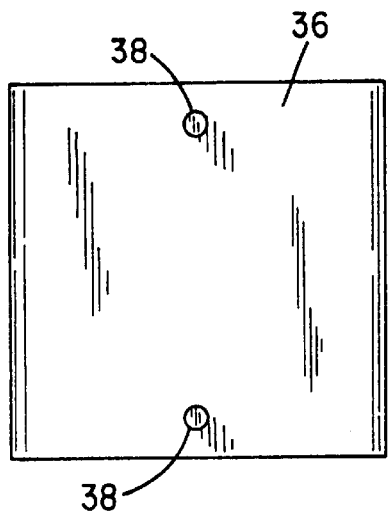
FIG. 4 is a bottom view of the insert of FIG. 1.

The insert 2 fastens to the lock assembly 4 with a number of studs 38 that are shown at FIGS. 2–4. The studs 38 mount in holes 40 that are displaced from the fastener holes 26. The studs 38 are molded slightly oversized from the holes 40. Once mounted, the studs 38 expand and securely retain the insert 2 to the lock 4.

Figure 5:
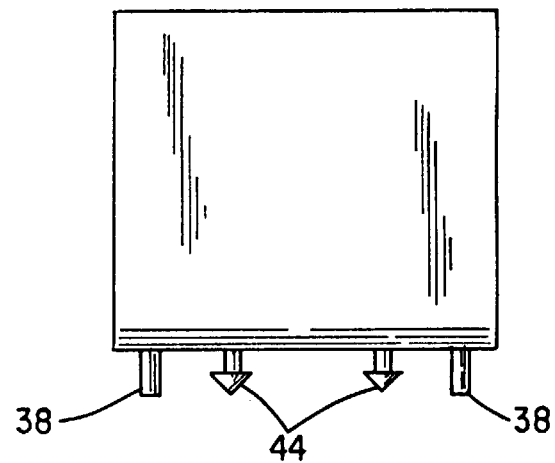
FIG. 5 is a front view of an insert having flanged fasteners.
Figure 6:
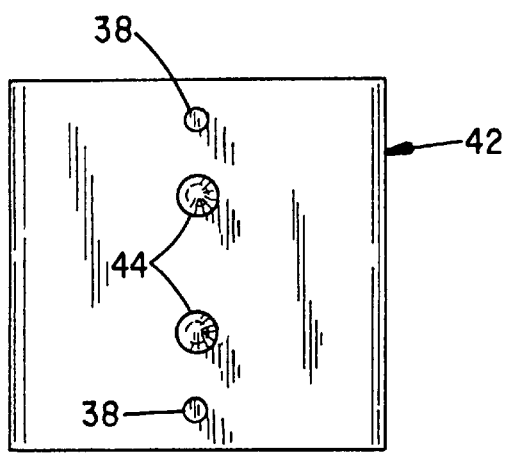
FIG. 6 is a bottom front view of the inserts of FIG. 5.

FIGS. 5 and 6 show another insert 42 that includes the studs 38 and a pair of flanged prongs 44. The prongs 44 mount in the counter bored fastener holes 26 to enhance the retention. The shape, number and placement of the studs and/or prongs 44 can be varied at any insert to achieve a desired retention force. A variety of other interlocking fasteners or fastening mechanisms can also be used, depending upon the available attachment points at the lock assembly. Preferably, the prongs or any other fastener sufficiently secures the insert 42 to prevent the insert 42 from dislodging during normal use, yet permits the user to switch or replace the insert 42 to accommodate any desired firearm.

In the latter regard, FIGS. 7–15 show a number of other inserts 50, 60, 70, 80, 90, 100, 110, 120 and 130 that are constructed to be compatible with a number of firearms that are commonly used by law enforcement personnel. Where, too, the insert 2 is shown in a generalized form with a solid base 36 and arms 32 and 34, the inserts 50–130 are constructed to provide a number of parallel webs that project from the walls of a surrounding shell. Each web is formed with a contoured recess that is shaped with smooth, ridged and/or arcuate surfaces to accept the firearm. The webs can flex as necessary to facilitate mounting.

Figure 7:
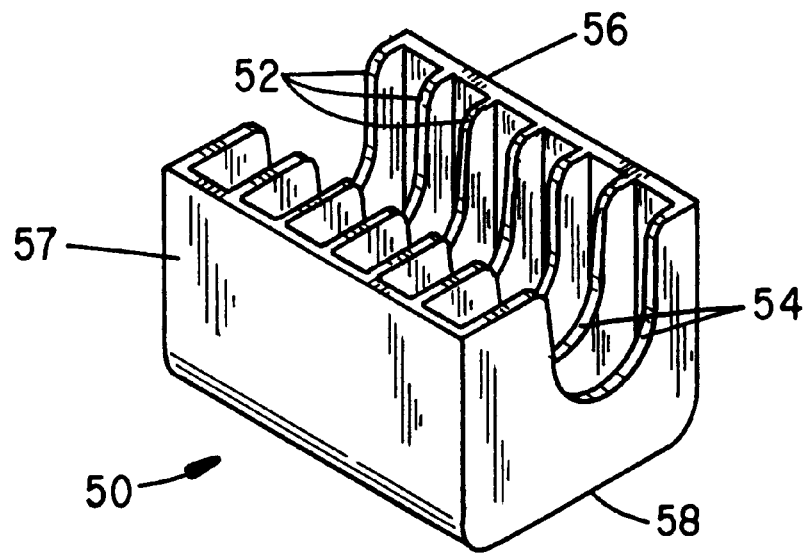
FIG. 7 is a perspective view of an insert for a Remington 870 shotgun.

For example, FIG. 7 shows the insert 50 which has several webs 52 that are each formed with a recess 54. The webs 52 extend from outer sidewalls 56 and 57 and base 58. The sidewalls 56 and 57 and base walls define a concave shell having a thickness in the range of 3/32 to 1/4 inch. The collection of recesses 54 is constructed to conform to the fore stock of a Remington 870 pump shotgun. The thickness and spacing between the webs 52 can be varied depending upon the material and durometer. Presently, a thermoplastic elastomer (TPE) material is used that exhibits a durometer in the range of 85 to 95 on the Shor "A" scale. The webs 52 exhibit a nominal thickness in the range of 1/16 to 1/4 inch and a spacing between webs 52 in the range of 1/4–5/8 inch.

Figure 8:
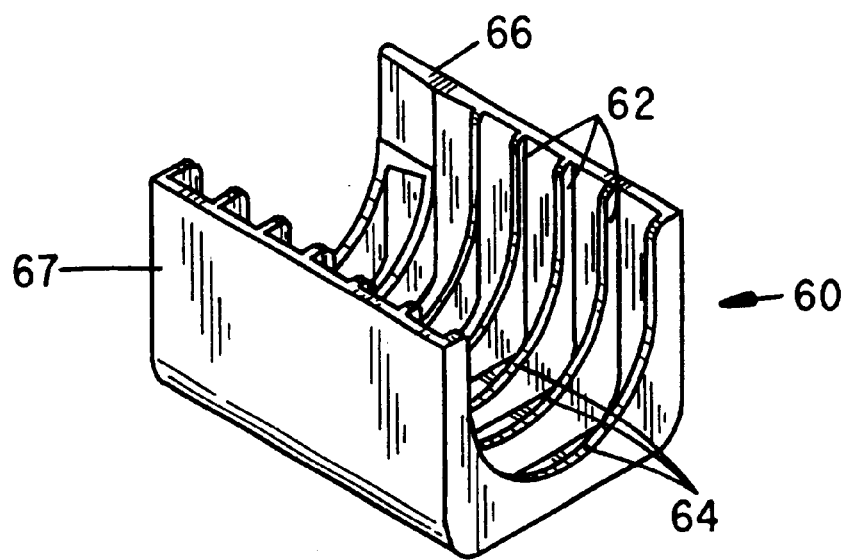
FIG. 8 is a perspective view of an insert for another Remington 870 shotgun.

FIG. 8 depicts the insert 60, which is also constructed with a number of webs 62, and recesses 64 that accept a Remington 870 pump shotgun. The width of the recesses 64 varies between the sidewalls 66 and 67 over the length of the insert 60. Some of the webs 62 only extend partially from the sidewall 66.

Figure 9:
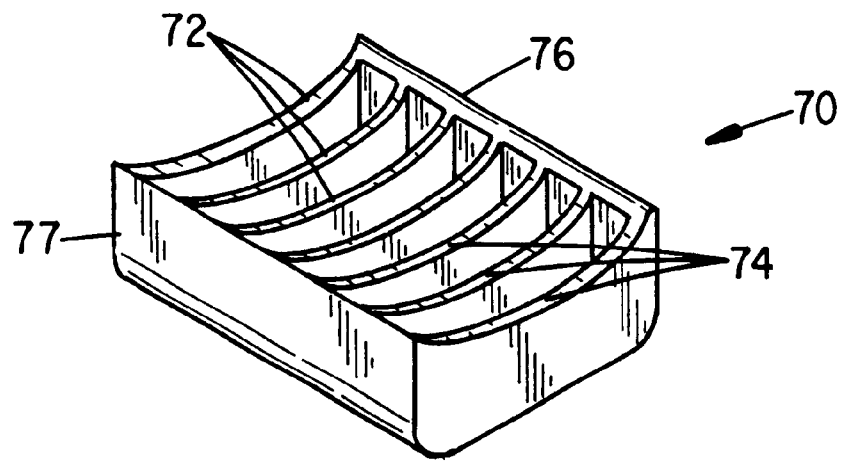
FIG. 9 is a perspective view of an insert for an M16-A1 rifle.

FIG. 9 depicts the insert 70, which is constructed with a number of webs 72, and low profile recesses 74 that accept an M16-A1 rifle. The webs 72 extend between the sidewalls 76 and 77 such that only a slight depression is exhibited.

Figure 10:
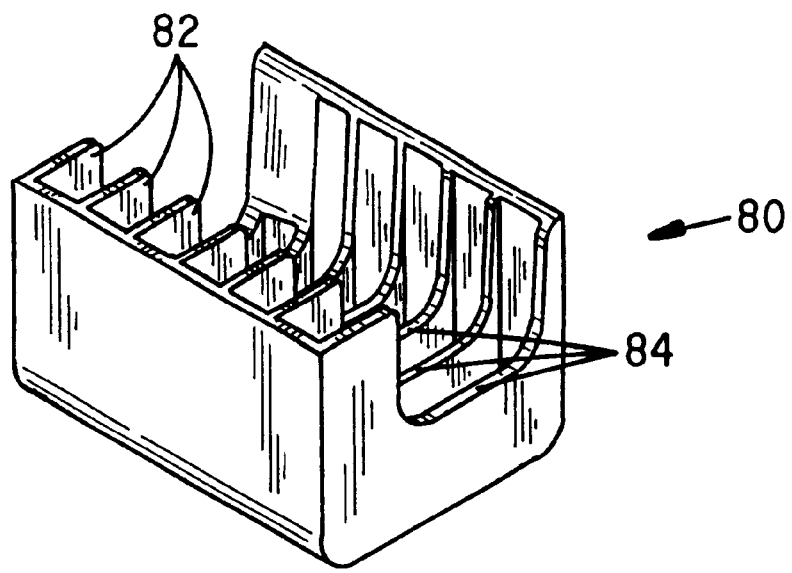
FIG. 10 is a perspective view of an insert for a Ruger rifle.
Figure 11:
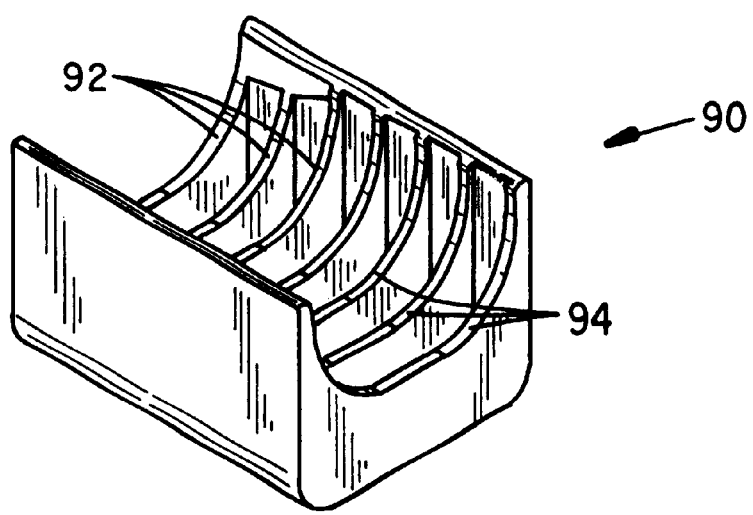
FIG. 11 is a perspective view of an insert for an A2 rifle.
Figure 12:
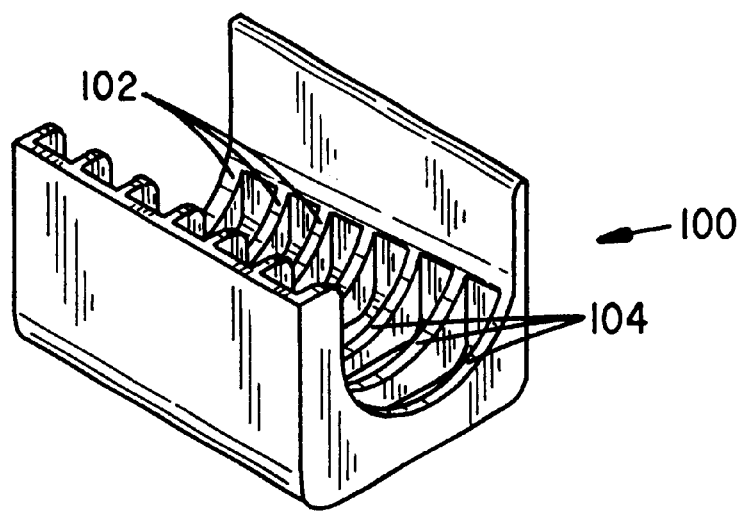
FIG. 12 is a perspective view of an insert for an mini 14 rifle.

FIGS. 10, 11 and 12 depict the inserts 80, 90 and 100, which are constructed to respectively support a Ruger carbine, an AR15-A2 and a Ruger mini-14 rifle. The webs 82, 92 and 102 are formed with appropriately shaped recesses 84, 94 and 104.

Figure 13:
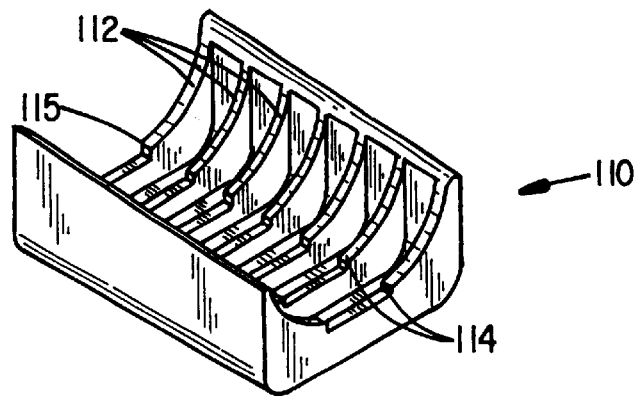
FIG. 13 is a perspective view of an insert for an M4 rifle.
Figure 14:
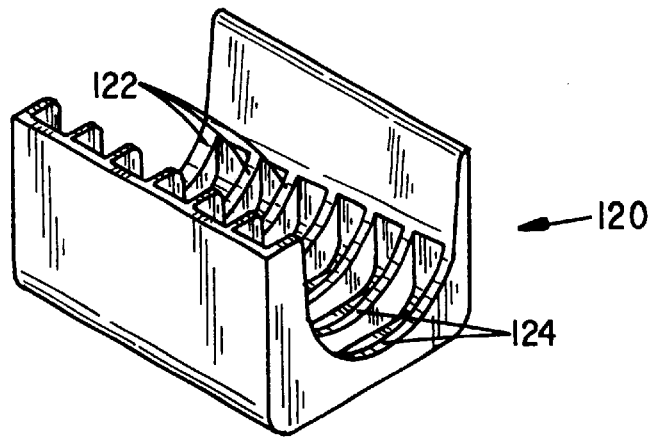
FIG. 14 is a perspective view of an insert for automatic rifle.
Figure 15:
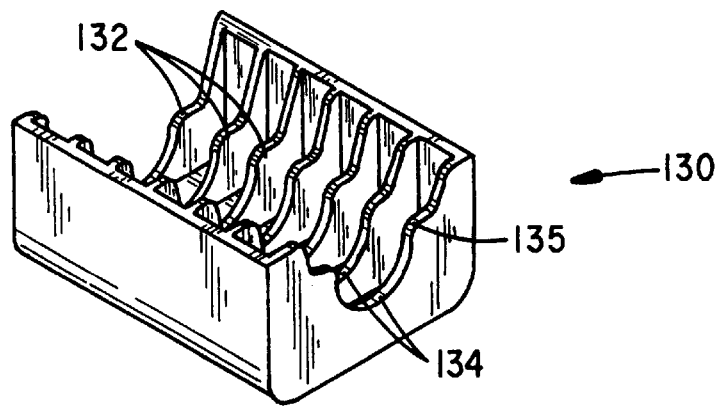
FIG. 15 is a perspective view of an insert for an MP5 rifle.

FIGS. 13, 14 and 15 depict the inserts 110, 120 and 130, which are constructed to respectively support a Colt M4, several automatic shotguns, and an H&K MP5 rifle. The webs 112, 122 and 132 are formed with appropriately shaped recesses 114, 124 and 134. The recesses 114 and 134 also include stepped ridges 115 and 135 that define regions of differing levels at the recesses 124 and 134.

While the invention has been described with respect to a number of presently preferred firearm support inserts and considered improvements or alternatives thereto, still other constructions may be suggested to those skilled in the art. That is, the disclosed features of the invention might be combined in different arrangements and with still other features in other lock assemblies. The foregoing description should therefore be construed to include all those embodiments within the spirit and scope of the following claims.

What is claimed is:

1. A firearm lock assembly comprising:
  a) a base having a concave channel defined by a bottom wall and sidewalls that project from said bottom wall;
  b) a latch arm mounted to pivot about said base at a hinge pin; and
  c) a resilient support cushion detachably mounted in said channel having a firearm support recess positioned beneath said latch arm, wherein said support cushion comprises a concave shell having a plurality of walls and said support recess is defined by a plurality of resilient, displaced, parallel, planar webs that project from the walls of said concave shell and wherein each web includes a recessed surface having a profile complementary shape to the surface contour of a supported firearm, whereby the firearm is substantially immovably cushioned in said lock assembly when mounted in said cushion.

2. A firearm lock assembly as set forth in claim 1 wherein said shell includes a projecting stud having a stem and a flange with a diameter greater than said stem and said base includes an aperture to receive said stud.

3. A firearm lock assembly as set forth in claim 1 wherein said support cushion is formed from a material selected from a class including elastomers, rubber, and foam.

4. A firearm lock assembly as set forth in claim 1 including a plurality of said detachable support cushions and wherein each support cushion defines a support recess complementary to a different firearm, whereby said support cushions can be interchanged to secure multiple firearms said lock assembly.

5. A firearm lock assembly comprising:

a) a base having a concave channel defined by a bottom wall and sidewalls that project therefrom;

b) a latch arm mounted to pivot about said base at a hinge pin; and c) a support cushion detachably mounted in said channel having a firearm support recess positioned beneath said latch arm, wherein said support cushion comprises a concave shell and said support recess is defined by a plurality of displaced parallel, planar webs that project from the walls of said concave shell and wherein each web includes a recessed surface having a profile complementary shape to the surface contour of a supported firearm, whereby the predetermined firearm is substantially immovably cushioned in said lock assembly when mounted in said cushion.

6. A firearm lock assembly as set forth in claim 5 wherein said support cushion includes a surface portion shaped to interlock with a mating portion of said base, whereby the support cushion is restrained to said base when said latch arm is hinged open.

7. A firearm lock assembly as set forth in claim 5 wherein said shell includes a projecting stud having a stem and a flange with a diameter greater than said stem and said base includes an aperture to receive said stud.

8. A firearm lock assembly comprising:

a) a base having a concave channel exposed on three sides defined by a bottom wall and sidewalls that project therefrom;

b) a latch arm mounted to pivot about said base at a hinge pin; and c) an elastomer support cushion detachably mounted in said channel having a firearm support recess, wherein said support cushion comprises a multi-walled shell and said support recess is defined by a plurality of displaced parallel, planar elastomer webs that project from bottom and side walls of said shell, and wherein each web includes a recessed surface that exhibits a profile complementary to the surface contour of a portion of a predetermined firearm, whereby the predetermined firearm is substantially immovably cushioned in said lock assembly when mounted in said cushion.

9. A firearm lock assembly as set forth in claim 8 wherein said stud includes a resilient flange that radially projects from a longitudinal stem and exhibits a diameter greater than the stem.

\* \* \* \* \*